UNITED STATES PATENT OFFICE.

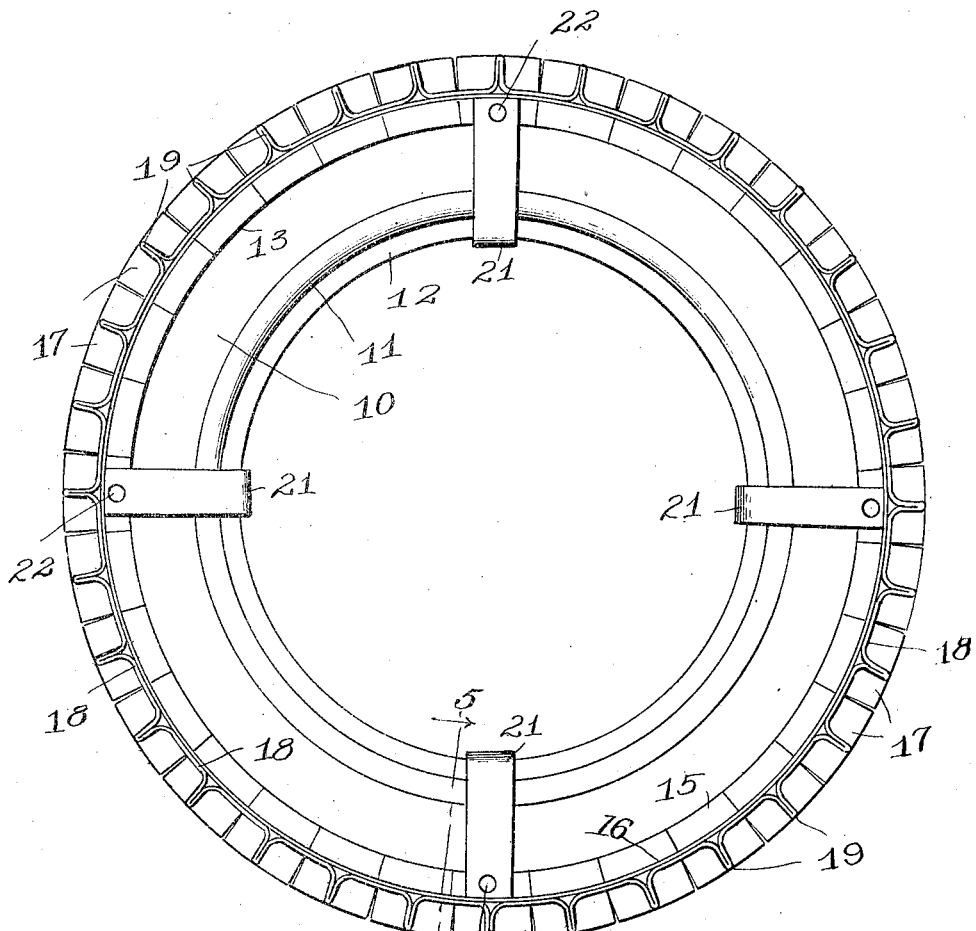
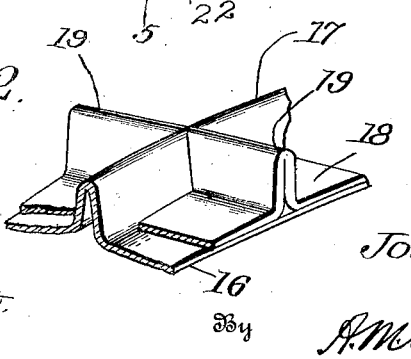

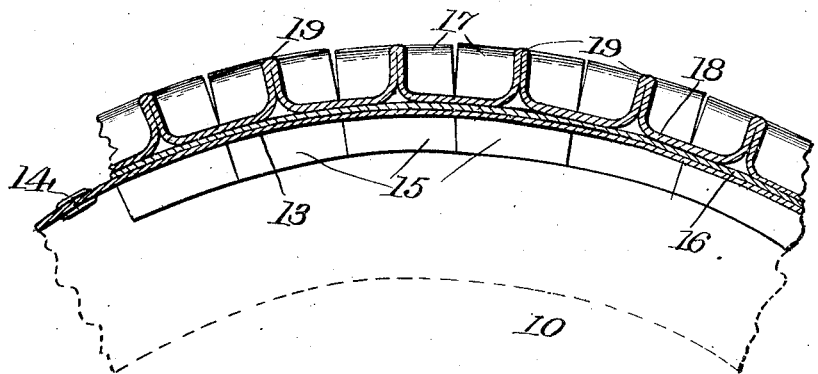
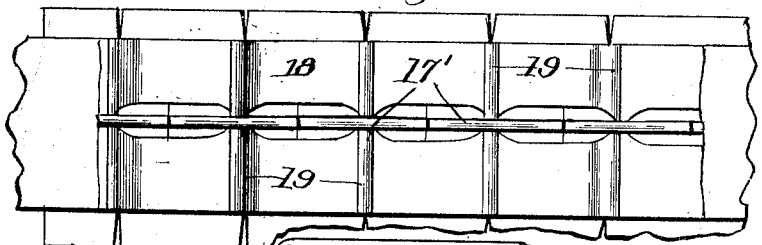
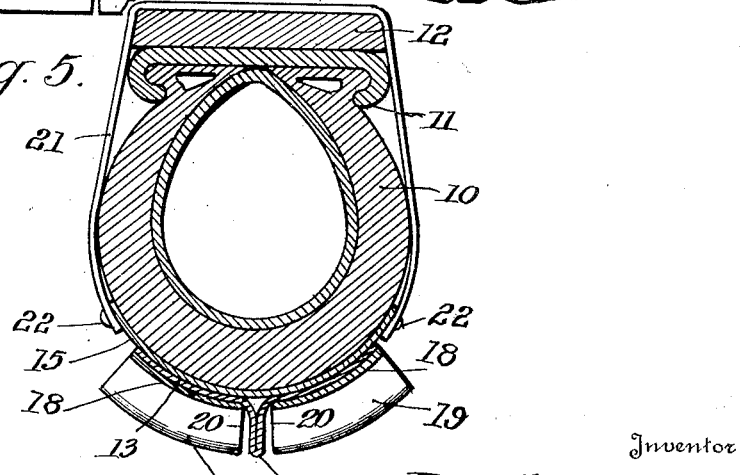

JOSEPH SADUS, OF FILBERT, WEST VIRGINIA.

NON-SKID DEVICE.

1,099,939.   Specification of Letters Patent.   Patented June 16, 1914.

Application filed February 16, 1914. Serial No. 818,923.

*To all whom it may concern:*

Be it known that I, JOSEPH SADUS, a subject of the Emperor of Austria-Hungary, residing at Filbert, in the county of McDowell and State of West Virginia, have invented certain new and useful Improvements in Non-Skid Devices, of which the following is a specification.

This invention relates to certain new and useful improvements in non-skid device.

An object of the present invention is the provision of a structure easily and cheaply manufactured from sheet material for positioning circumferentially upon the tires of wheels, such as automobile wheels, to positively prevent both a side slipping or skidding of the vehicle as well as affording a positive ground contact for traction purposes.

A further object is to provide a single metallic element in a single length or strip for lacing upon an automobile tire and fitting the same upon an inflation of the tire while having a positive tread grip both longitudinally and transversely arranged.

A still further object is to provide a non-skid member of a circumferential base strip with a bent strip mounted thereon having a plurality of longitudinal ribs and the latter having bent side strips mounted with transverse ribs centrally positioned upon either side of each longitudinal rib portion.

With these general objects in view and others that will appear as the nature of the invention is better understood the same consists in the novel construction and combination of parts as will be hereinafter more fully described and pointed out in the appended claims.

In the drawings forming a part of this application and in which like numerals of reference designate corresponding parts throughout the several views —Figure 1 is a side elevation of a pneumatic tire having the device mounted thereon. Fig. 2 is a detail view of the rib formation thereof. Fig. 3 is a central vertical longitudinal sectional view of the device in position, and with the tire shown in dotted lines. Fig. 4 is a plan view of a section of the device detached, and partly broken away and Fig. 5 is a transverse sectional view upon line 5—5 of Fig. 1.

Referring more in detail to the drawings, the present invention is herein illustrated, being mounted upon the pneumatic tire 10 which in turn, is positioned in the clencher rim 11 upon the felly 12.

The non-skid member adapted to be secured to the tread portion of the tire comprises the base plate 13 which is preferably made of sheet metal in a strip of sufficient length to substantially encircle the tire and is positioned thereon when the tire is partly deflated, the ends of said member being secured together as desired and preferably by the lacing 14, while the side edges of said strip are incised at regular intervals forming side flaps 15 engaging the tire and allowing the base strip to readily assume the curved hoop formation. Co-extensive with the length of said base strip and secured to the outer face thereof is the rib plate 16 having the central longitudinal rib 17 which is formed therein by a folding of the strip along its longitudinal central line as best shown in Fig. 2, and after which the rib 17 is transversely cut at regular intervals forming the separate longitudinal rib portions 17'. Upon each side of the rib 17 there is mounted a rib strip 18 which is folded at regular intervals into ribs 19 of double thickness, the said ribs 19 thereby lying transversely of the member and in alinement upon opposite sides of and substantially mid-way of the length of each of the longitudinal rib portions 17'. The inner faces of the transverse ribs 19 are slightly inclined at 20 when the device is in its straightened condition which provides the same substantially parallel to the longitudinal rib 17 when placed upon the tire, while the flaps 15 being separated when not in use are brought substantially together when the device is placed in hoop form and the longitudinal rib sections 17' are slightly separated by this action when the device is placed upon the tire.

Placing the base strip upon the tire when partly deflated, then securing the lacing 14 and again re-inflating the tire, positions the non-skid firmly upon the latter and the securing straps 21 of leather, rubber or any other material desired are provided at regular intervals and secured by screws, rivets, hooks, or other fastening means 21 to opposite flaps 15 of the base strip.

that the complete device when not in use is in the form of a strip member which may be easily stored away or carried in the automobile, preferably coiled up in a small space, being preferably formed entirely of thin spring metal, and which in the manner scribed, is readily attached to the periphery of the tire and then affords a most positive traction surface for the entire tire tread.

While the forms of the invention herein shown and described as well as the material from which the same is constructed, is believed to be preferable, it is nevertheless to be understood that minor changes may be made in the form, proportion and details of construction without departing from the spirit and scope of the invention.

What I claim as new is:—

1. A device of the class described comprising a base strip, a rib plate mounted thereon and bent with a central longitudinal rib, rib strips secured to the outer face of said rib plate and bent into spaced-apart transverse ribs.

2. A device of the class described comprising a base strip, a rib plate having integral bent longitudinal rib members thereon, and rib strips positioned at opposite sides of said rib member and upon said rib plate and integrally bent into transverse ribs.

3. A device of the class described comprising a base strip, a rib plate bent with an integral longitudinal rib and mounted upon said base strip, and said rib being divided into sections, rib strips mounted upon the rib plate at each side of the rib thereof and bent upon themselves forming transverse ribs arranged in alinement and substantially mid-way of the lengths of the longitudinal rib sections.

4. A device of the class described comprising a base plate adapted for encircling a tire and having slotted edge portions forming side flaps, lacings for uniting the free ends of said strip, a rib plate co-extensive in length with said base strip and centrally folded at substantially right angles to its side portions into a longitudinal rib divided into equal sections, separate rib strips mounted upon the rib plate at opposite sides of said longitudinal rib and folded upon themselves into equally-spaced ribs substantially perpendicular to the main portions of the rib strip and forming transverse ribs in substantial alinement at opposite sides of the middle point of the longitudinal rib sections.

5. A device of the class described comprising a metallic base strip having side flaps, a rib plate flatly engaging said base strip and centrally folded upon itself into a plurality of longitudinal rib sections, rib strips upon opposite sides of said sections secured to the rib plate and integrally bent into transverse rib sections positioned centrally in alinement at opposite sides of the longitudinal rib sections, the inner faces of the transverse rib sections being substantially parallel to the adjacent faces of the longitudinal rib sections when in position upon a tire, and strap members secured between opposite ones of said flaps.

In testimony whereof I affix my signature in presence of two witnesses.

JOSEPH SADUS.

Witnesses:
 PHILIP TURK,
 L. E. WOODS.